UNITED STATES PATENT OFFICE.

PAUL GONDOLO, OF PARIS, FRANCE, ASSIGNOR TO THE GONDOLO TANNIN COMPANY, OF HUNTINGDON, PENNSYLVANIA.

PROCESS OF CLARIFYING TANNIN EXTRACTS.

SPECIFICATION forming part of Letters Patent No. 283,881, dated August 28, 1883.

Application filed December 10, 1881. (No specimens.) Patented in France March 12, 1879, No. 129,541; in England March 18, 1879, No. 1,070; in Belgium March 19, 1879, No. 47,694; in Germany April 2, 1879, No. 7,864; in Italy April 2, 1879, No. 10,827; in Austria April 7, 1879, No. 1,076, and in Spain July 28, 1879, No. 385.

*To all whom it may concern:*

Be it known that I, PAUL GONDOLO, of Paris, in the Republic of France, have invented a new and useful Improvement in the Process of Clarifying Tannin Extracts, of which improvement the following is a specification.

This improvement is described or contained in French Letters Patent No. 129,541, granted to me under date of March 12, 1879, for fifteen years, and in English Letters Patent No. 1,070, obtained in my behalf under date of March 18, 1879, for fourteen years.

The object of my invention is to provide a new method of clarifying tannin extracts, by means of which the same will be obtained in a superior and clear condition.

Having obtained the tannin extract from vegetable matter by treating such matter, as is well understood, but preferably in the manner described in Letters Patent of the United States, No. 231,035, granted to me under date of August 10, 1880, I take the decoction obtained from that process and pass it through a third operation, which clarifies it. For this purpose blood is added to the solution; but before such addition the temperature of the decoction is reduced to a point below that which would coagulate the blood, so that the blood will be diffused through and pervade the whole solution instead of coagulating in a lump. The temperature is then raised above the coagulating-point of the blood, and the coloring-matter and salts are caught and held by the coagulant and precipitated with it. The decoction is then left undisturbed for about an hour, when the supernatant liquid may be drawn off and filtered, and concentrated in the open air or in a vacuum from 3° to 45° Baumé.

The tannin extract obtained by this process is of a honey-yellow color, whereas the tannin extract that is generally produced has a deep chestnut-brown color, which prevents the same from being of general use in tanneries.

My process can be applied for clarifying tannin obtained from wood, roots, leaves, bark, husks, grain, fruit, or from all vegetable matter containing the same.

In my said American Patent No. 231,035 this process of clarification is described but not claimed separately from the other steps or stages of the process described in that patent for obtaining the extract, while in this patent I do not claim any of the steps or stages of the process of obtaining the extract itself, but only the described method of clarifying the extract, however obtained.

I am also aware that it has been proposed to use glue or mucilage for decolorizing tannin-juices, as described in the patent to Bossiere, September 1, 1868, and I make no claim to anything he sets forth; but,

Having thus described my invention, I claim as new and desire to secure by Letters Patent—

The process herein described of clarifying tannin extracts, which process consists in taking the extract at a temperature below that at which blood or albumen coagulates, adding the coagulant to and diffusing it through the extract at such temperature, and then raising the temperature of the mixture, so as to coagulate the blood or albumen, and precipitating the coagulated blood with the other foreign matters or impurities, substantially as and for the purposes described.

P. GONDOLO.

Witnesses:
EDW. D. THURSTON,
TIMOTHY J. SHEA.